United States Patent
She et al.

(10) Patent No.: US 10,144,011 B2
(45) Date of Patent: Dec. 4, 2018

(54) SYSTEM FOR POWDER HEAT TREATMENT AND CLASSIFICATION VIA FLUIDIZED BED

(71) Applicant: United Technologies Corporation, Farmington, CT (US)

(72) Inventors: Ying She, East Hartford, CT (US); Aaron T. Nardi, East Granby, CT (US); Lawrence Binek, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 144 days.

(21) Appl. No.: 14/972,199

(22) Filed: Dec. 17, 2015

(65) Prior Publication Data
US 2017/0173591 A1    Jun. 22, 2017

(51) Int. Cl.
| | |
|---|---|
| B03B 4/00 | (2006.01) |
| B03B 1/02 | (2006.01) |
| B22F 1/00 | (2006.01) |
| B07B 4/00 | (2006.01) |
| B07B 7/01 | (2006.01) |
| B07B 9/02 | (2006.01) |

(52) U.S. Cl.
CPC .............. *B03B 4/00* (2013.01); *B03B 1/02* (2013.01); *B07B 4/00* (2013.01); *B07B 7/01* (2013.01); *B07B 9/02* (2013.01); *B22F 1/0081* (2013.01); *B22F 1/0085* (2013.01)

(58) Field of Classification Search
CPC ..... B03B 1/02; B03B 4/00; B07B 4/02; B22F 1/0081; B22F 1/0085
USPC .... 209/2, 11, 44, 44.1, 138, 139.1, 146, 659
See application file for complete search history.

(56) References Cited

U.S. PATENT DOCUMENTS

| | | | |
|---|---|---|---|
| 4,730,093 A | 3/1988 | Mehta et al. | |
| 4,746,547 A | 5/1988 | Brown et al. | |
| 5,213,820 A * | 5/1993 | Uhlemann | B01J 2/16 209/147 |
| 5,976,456 A | 11/1999 | Ziani et al. | |
| 6,251,158 B1 | 6/2001 | Dube et al. | |
| 6,376,148 B1 | 4/2002 | Liu et al. | |
| 6,645,412 B2 | 11/2003 | Priedeman, Jr. | |
| 6,811,765 B1 | 11/2004 | Maiwald et al. | |

(Continued)

FOREIGN PATENT DOCUMENTS

| | | |
|---|---|---|
| CN | 204139106 | 2/2015 |
| JP | H07256213 | 10/1995 |

(Continued)

OTHER PUBLICATIONS

European Search Report for Application No. 16205178.3 dated May 30, 2017.

*Primary Examiner* — Joseph C Rodriguez
*Assistant Examiner* — Kalyanavenkateshware Kumar
(74) *Attorney, Agent, or Firm* — Carlson, Gaskey & Olds, P.C.

(57) ABSTRACT

A fluidized powder heat treatment classification assembly includes a gas source. A fluidized bed is connected to the gas source via a metered connection. The fluidized bed includes a first output connected to a powder classifier via at least a first valve. The powder classifier includes a catch container operable to decelerate a gas flow from the output and operable to catch particles entrained in the gas flow.

10 Claims, 4 Drawing Sheets

(56) References Cited

U.S. PATENT DOCUMENTS

| | | |
|---|---|---|
| 7,141,207 B2 | 11/2006 | Jandeska, Jr. et al. |
| 7,244,323 B2 | 7/2007 | White et al. |
| 2003/0080220 A1* | 5/2003 | Mather .................... B05B 1/04 239/690 |
| 2006/0045787 A1 | 3/2006 | Jandeska, Jr. et al. |
| 2009/0260541 A1* | 10/2009 | Kragten ................. C09D 5/031 106/439 |
| 2010/0009080 A1* | 1/2010 | Jan Snijders ....... C23C 16/4481 427/255.28 |
| 2012/0328465 A1 | 12/2012 | Eder et al. |
| 2013/0129563 A1* | 5/2013 | Kaplowitz ................ B22F 9/24 420/528 |
| 2015/0028523 A1 | 1/2015 | Jaker et al. |

FOREIGN PATENT DOCUMENTS

| | | |
|---|---|---|
| WO | 2015023438 | 2/2015 |
| WO | 2015023439 | 2/2015 |

* cited by examiner

SYSTEM FOR POWDER HEAT TREATMENT AND CLASSIFICATION VIA FLUIDIZED BED

TECHNICAL FIELD

The present disclosure relates generally to powder classification systems, and more specifically to a method and apparatus for classifying a degassed or heat treated a powder.

BACKGROUND

Metal powders, such as those utilized in additive manufacturing processes, frequently need to be classified, degassed, and/or heat treated before they are able to be used in an industrial process. By way of example, powders for a cold spray process must be classified into particle size ranges, to ensure that the particles used are within acceptable tolerances. Further, it may be desirable in some examples to degas the powder particles in order to remove any contaminants adsorbed on the surface of the powder. The contaminants can be any other material, including water moisture or similar atmospheric contaminants adsorbed on the surfaces of the powder. It may also be desirable to heat treat the powder to achieve the correct powder structure, for example solution treating, annealing, homogenizing, etc.

Existing classification systems utilize sieves or use air or inert gas classification. Sieves are inefficient at removal of fine particles and typical gas classification systems, even those that utilize inert gas, require the powder to be exposed to the atmosphere before or after the classification process. Neither of these processes address the needs for heat treatment or degassing Existing degassing processes use a vacuum to draw moisture or other contaminants off of powder surfaces. This process is long due to the low transport rate of these contaminants through the bed. In a fluidized bed transport is enabled by the flow of an inert gas through the bed.

Other existing heat treatment processes include static heat treatment of powder in a furnace or in some cases in a rotating tube furnace. In either case no classification is performed, and the powder is exposed to the atmosphere during transfer to secondary containers.

SUMMARY OF THE INVENTION

In one exemplary embodiment a fluidized powder heat treatment classification assembly includes a gas source, a fluidized bed connected to the gas source via a metered connection, the fluidized bed including a first output connected to a powder classifier via at least a first valve, and the powder classifier including a catch container operable to decelerate a gas flow from the output and operable to catch particles entrained in the gas flow.

Another exemplary embodiment of the above described fluidized power heat treatment classification assembly further includes at least a first container configured to retain particles caught in said catch container.

In another exemplary embodiment of any of the above described fluidized power heat treatment classification assemblies the first valve is one of a multi-output valve and a network of two-way valves, and wherein the assembly further comprises a fine powder collector.

In another exemplary embodiment of any of the above described fluidized power heat treatment classification assemblies the fine powder collector includes a first fine powder collection chamber, and a liquid bubbler chamber connected to an output of the fine powder collection chamber.

In another exemplary embodiment of any of the above described fluidized power heat treatment classification assemblies the fine powder collection chamber is shaped such that a flow of gas into the collection chamber is decelerated.

In another exemplary embodiment of any of the above described fluidized power heat treatment classification assemblies the fluidized bed is a heated degassing chamber.

In another exemplary embodiment of any of the above described fluidized power heat treatment classification assemblies the fluidized bed tapers into said first output and said taper is configured to accelerate a gas flow out of the first output.

Another exemplary embodiment of any of the above described fluidized power heat treatment classification assemblies further includes an output line connecting the fluidized bed to the first valve and a vibrator coupled to the output line, the vibrator being configured to vibrate the output line.

In another exemplary embodiment of any of the above described fluidized power heat treatment classification assemblies the fluidized bed includes a primary chamber including a perforated floor, a gas inlet below said perforated floor, such that gas entering the fluidized bed flows upward through said perforated floor to said first output.

In another exemplary embodiment of any of the above described fluidized power heat treatment classification assemblies a speed of said gas is controlled via a gas inlet valve, and the gas inlet valve is controlled by a controller.

Another exemplary embodiment of any of the above described fluidized power heat treatment classification assemblies further includes a cooling loop disposed between said first output and said powder classifier, the cooling loop being configured to cool a fluid passing from the first output to the powder classifier.

An exemplary method for heat treating and classifying powders includes degassing a powder in a fluidized bed, entraining particles of said powder below a first particle size in a gas stream, transmitting the gas stream to a classification chamber, and depositing the entrained particles in a sealable container within the classification chamber.

In another example of the above described exemplary method for heat treating and classifying powders degassing a powder in a fluidized bed comprises disposing said powder in a degassing chamber interior to a heater, and heating the degassing chamber.

In another example of any of the above described exemplary methods for heat treating and classifying powders entraining particles of said powder below a first particle size in a gas stream comprises passing said gas stream from a gas source through a perforated plate in said degassing chamber, through said powder, and to an outlet of said degassing chamber.

In another example of any of the above described exemplary methods for heat treating and classifying powders transmitting the gas stream to a classification chamber comprises passing the gas stream through a line and vibrating the line using a vibrator.

In another example of any of the above described exemplary methods for heat treating and classifying powders depositing the entrained gas particles in a sealable container comprises decelerating a flow of said gas stream such that particles entrained in the gas stream are deposited in a catch container.

Another example of any of the above described exemplary methods for heat treating and classifying powders further includes entraining particles of said powder below a second particle size in the gas stream prior to transmitting the gas stream to the classification chamber and depositing the entrained particles in the sealable container, the second size being smaller than the first size, transmitting the gas stream to a fine particle collector and depositing the particles in at least a first container within the fine particle classifier.

In another example of any of the above described exemplary methods for heat treating and classifying powders depositing the particles within at least a first container within the fine particle collector includes passing said gas stream through a fine particle collector and a liquid bubbler such that at least a portion of the particles entrained in the gas stream are deposited in said fine particle collector and a remainder of the particles is suspended within a liquid in the liquid bubbler.

In another example of any of the above described exemplary methods for heat treating and classifying powders the first size is controlled via adjusting a flow speed of the gas stream.

In one exemplary embodiment a heat treatment and powder classification system includes a fluidized bed including a degassing chamber, a first powder classifier connected to an output of the fluidized bed via a sealed gas line and a three way valve, a fine powder collector connected to the output of the fluidized bed via a second sealed gas line and the three way valve, and wherein said fluidized bed, said powder classifier and said fine powder collector are sealed such that a powder within the heat treatment and powder classification system is prevented from being exposed to an ambient atmosphere.

These and other features of the present invention can be best understood from the following specification and drawings, the following of which is a brief description.

DETAILED DESCRIPTION OF AN EMBODIMENT

Figure 1:
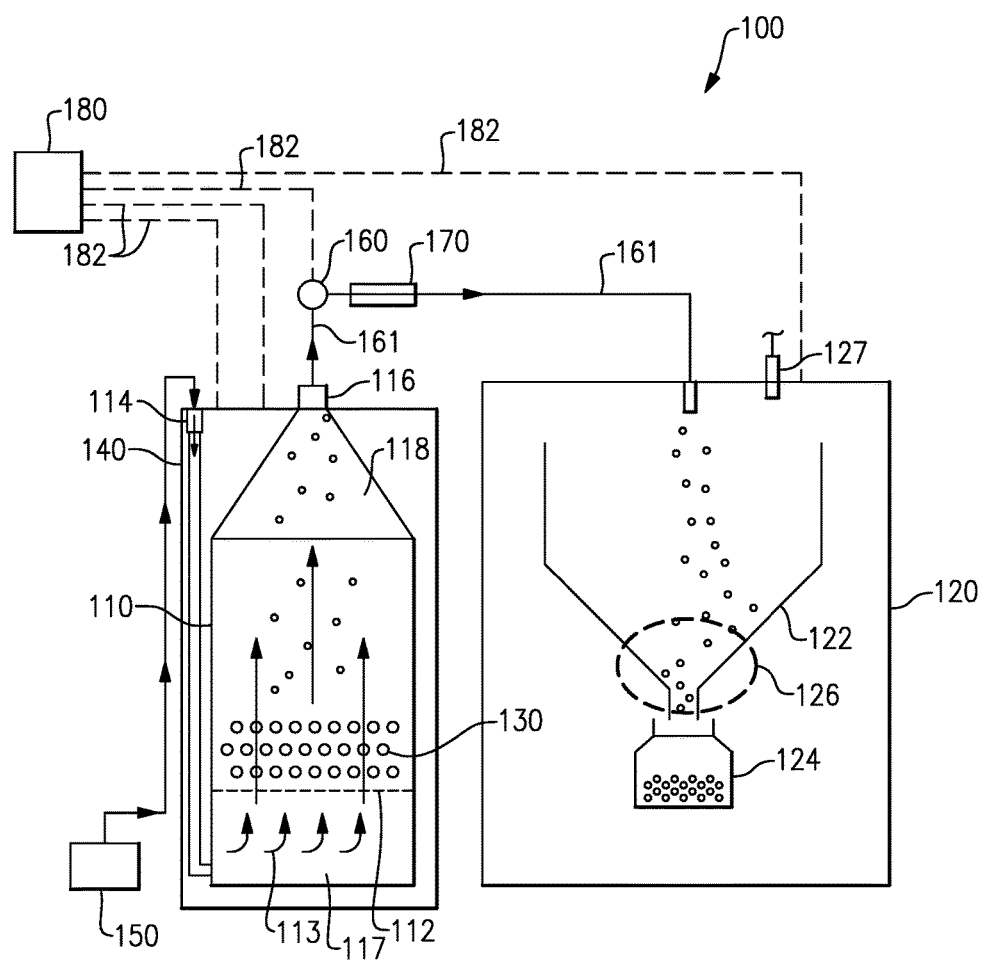
FIG. 1 schematically illustrates a fluidized powder classification system including a degassing chamber.

FIG. 1 schematically illustrates a powder classification system 100 including a fluidized bed 110 and a classification chamber 120. A powder 130 is disposed within the fluidized bed 110. The fluidized bed 110 includes a perforated plate 112 forming a floor, and a metered gas inlet 114 providing a flow 113 of gas below the perforated plate 112. The flow of gas originates from gas source 150, such as an inert gas source. The perforations in the perforated plate 112 are smaller than the particle size of a powder 130 being degassed within the fluidized bed 110.

The fluidized bed 110 is contained within a heater 140 that provides necessary heat for a degassing process of the specific material of the powder 130. At a top end of the fluidized bed 110, relative to a direction of gravity, is an output 116. The output 116 is connected to the classification chamber 120 via a valve 160 and at least one output line 161. In some examples, a vibrator 170, such as an electric vibrator, is coupled to one or more of the output lines 161. The vibrator 170 vibrates the corresponding output line 161 and prevents particles entrained in the gas flow within the output line 161 from sticking. While within the fluidized bed 110, and while entrained within the gas flow, the powder 130 behaves as a fluid and the process is referred to as a fluidized powder classification process.

The output line 161 connects to, and enters, the classification chamber 120. Within the classification chamber 120 is a powder catch component 122 which funnels powder entrained in the gas flow from the output line 161 into a sealable container 124. Also included in the classification chamber 120 is a vent 127 that is configured to vent gas from the classification chamber 120 without allowing an ambient atmosphere to enter the classification chamber 120. The fluidized bed 110, the output lines 161 and the classification chamber 120 are fully sealed and the powder 130 is not exposed to an ambient atmosphere at any point in the process.

Each of the components within the powder classification system 100 is controlled via a controller 180. In some examples, the controller 180 can be a single computer or computer processor. In alternate examples, the controller 180 can be a primary controller communicating with distributed local computers and controlling the process indirectly. In yet further examples, alternative control configurations utilizing one or more digital controls to control the process flow can be utilized. The illustrated control connections 182 are exemplary in nature. One of skill in the art, having the benefit of this disclosure, will understand that the controller 180 can be coupled to, and control, any controllable element within the powder classification system 100.

During operation of the powder classification system 100, the gas source 150 provides a stream of inert gas into the fluidized bed 110 via the inlet 114. The stream of inert gas enters a plenum 117 beneath the perforated plate 112. The stream of inert gas then proceeds upwards through the perforations in the perforated plate 112. As the stream of inert gas passes through the powder 130, particles are entrained in the stream of inert gas and carried upwards. The speed at which the stream of inert gas is flowing determines the size of the particles that are entrained, with a faster stream of inert gas entraining larger particles. One of skill in the art having the benefit of this disclosure will appreciate that the speed of the inert gas required to entrain particles of a certain desired size can be calculated according to known principles.

As the stream of inert gas travels upwards, the stream enters a tapered region 118, where the fluidized bed 110 is tapered toward the output 116. The tapered region 118 accelerates the stream of inert gas as the stream approaches the output 116, thereby ensuring that the entrained particles stay entrained in the gas stream through the output line 161.

The output line 161 connects to the classification chamber 120, where the stream of inert gas is output into the powder catch component 122. The powder catch component 122 is sized and shaped such that the stream of gas flowing from the output line 161 is decelerated, and powder particles entrained within the gas flow fall out of the gas flow and are caught by the powder catch component 122. The powder catch component 122 includes a funnel section 126 that funnels the formerly entrained particles into a sealable container 124.

The sealable container 124 can be automatically sealed using any number of known sealing techniques while still within the classification chamber 120. Using the above process, all particles below a certain size can be removed from the powder 130, and contained within a corresponding sealable container 124.

After an initial iteration of the above described process, the process can be repeated, with an increased speed of the inert gas stream. By repeating the process with an increased flow speed, a second sealable container 124 can be filled with powder particles within a specific range. By way of example, if the first iteration classifies all particles with a size of less than 20 microns, then a second iteration classifying all particles with a size of less than 50 microns will result in a powder having particles within the range of 20-50 microns being sealed in the sealable container 124.

Figure 2:
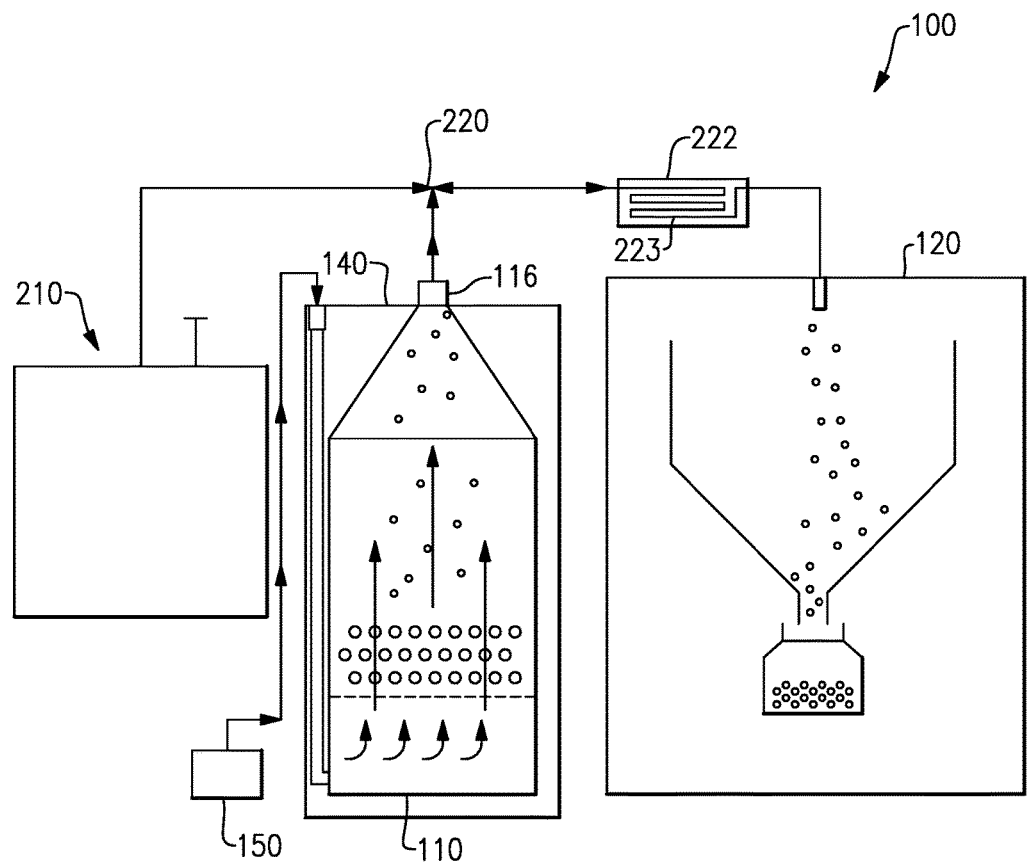
FIG. 2 schematically illustrates the fluidized powder classification system of FIG. 1 with an additional fine particle collector.

With continued reference to FIG. 1, and with like numerals indicating like elements, FIG. 2 schematically illustrates the fluidized powder classification system 100 of FIG. 1, with an additional fine particle collector 210. In some examples, the powder 130 can include very fine particles that can be airborne, or semi-airborne, once classified from the primary powder 130. In such an example, the previously described classification chamber 120 can be unsuitable to classify the very fine particles in the powder 130.

In order to classify the very fine particles, a fine particle collector 210 is connected to the system. The powder classification system 100 includes a fluidized bed 110 disposed within a heater 140, as described above with regards to FIG. 1. Connected to the fluidized bed 110 is a gas source 150. A three way valve 220 is connected to the output 116 of the fluidized bed 110, and controls a flow of the output gas from the fluidized bed 110 to either the classification chamber 120 or the fine particle collector 210. The three-way valve 220 can be controlled using any know control means, including the controller 180 illustrated in FIG. 1.

During the first iteration of the process, the three way valve 220 is configured to pass the gas from the outlet 116 to the fine particle collector 210. During subsequent iterations, the three way valve 220 is switched, and sends the gas stream to the classification chamber 120, which collects and classifies the particles as described above with regards to FIG. 1.

For processes and materials requiring rapid cooling from elevated temperatures it is possible to also include a cooling loop 222 between the fluidized bed and the catch container. The cooling loop 222 is, in some examples, a tubing coil 223 submerged in a cooling liquid such as ice water, liquid nitrogen, or a dry ice alcohol mix, etc. This coil 223 is sufficiently long to enable cooling of the particles exiting the fluidized bed prior to entering the catch container. In alternative examples, the cooling loop 222 can be any other known system capable of cooling the fluid.

Figure 3:
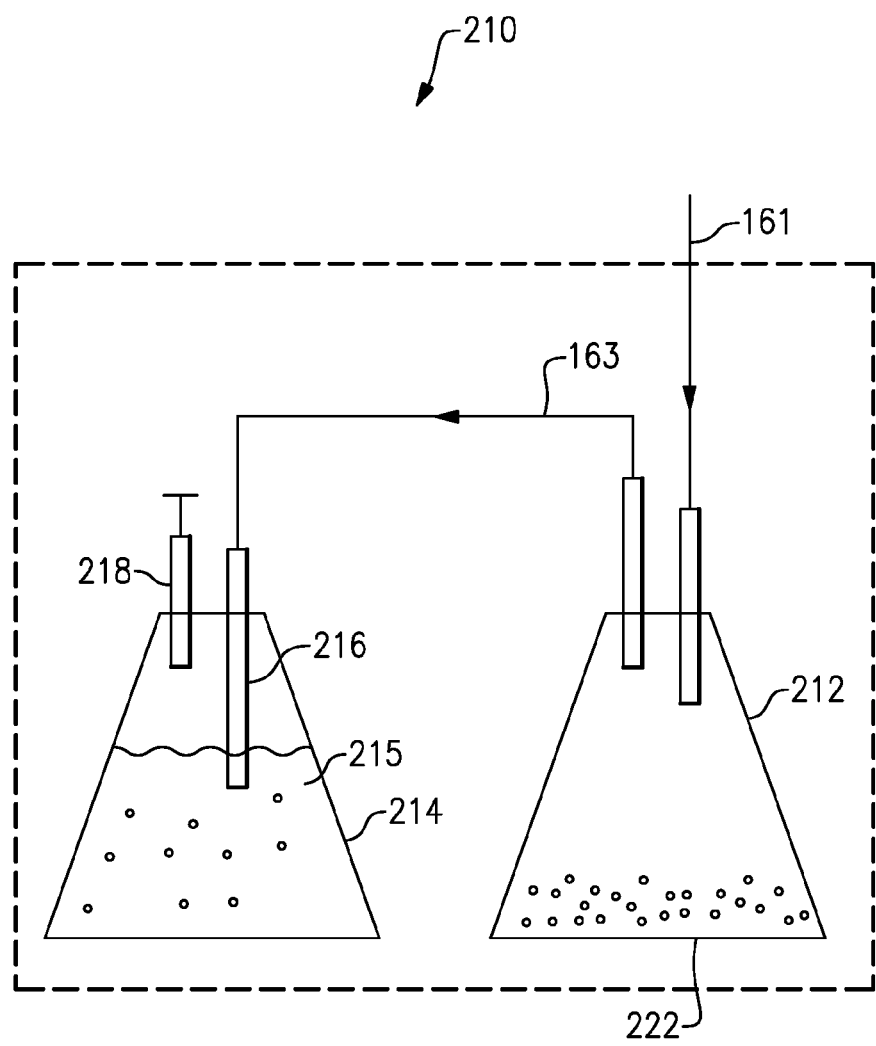
FIG. 3 schematically illustrates the fine particle collector in greater detail.

The specific configuration and operation of one example fine particle collector 210 is schematically illustrated in FIG. 3. The example fine particle collector 210 of FIG. 3 includes a first fine powder collector 212 connected directly to the output line 161 from the three way valve 220 illustrated in FIG. 2. A second output line 163 provides a gas stream output from the fine powder collector 210 to a liquid bubbler collector 214. The liquid bubbler collector 214 includes an inlet 216 that outputs the gas stream from the second output line 163 into the liquid bubbler collector 214 below a surface of a liquid 215. In some examples the liquid is water. In other examples, other types of liquids can be utilized in place of water.

When a gas stream is directed to the fine particle collector 210 via the three way valve 220, the gas stream initially enters the fine particle collector 212. The fine particle collector is tapered away from the incoming gas stream, thereby decelerating the gas stream and allowing particles 222 to collect at the bottom of the fine particle collector 212. One of skill in the art will appreciate that at least a portion of the particles may be small enough that minor gas currents will entrain the particles. Such particles are not deposited in the base of the fine particle collector 212. These particles are referred to as extremely fine.

In order to remove the extremely fine particles from the gas stream prior to venting the gas from the fine particle collector 210, the second output line 163 connects an output of the fine particle collector with an input of liquid bubbler collector 214. As the gas stream passes through the liquid 215 within the liquid bubbler collector 214, all of the extremely fine particles are removed from the gas stream and become suspended in the liquid 215 within the liquid bubbler 214. A vent 218 vents gas from the liquid bubbler collector 214. In alternative examples, the gas output at the vent 218 can be collected and returned to the gas source 150 (illustrated in FIGS. 1 and 2) or repurposed for any other suitable use.

Once the fine particles and the extremely fine particles have been removed from the powder 130, as described above, the three way valve 220 connects the fluidized bed 110 to the powdered classification chamber 120, and the process described above with regards to FIG. 2 is reiterated to classify the powder into any number of particle size classifications.

With continued reference to FIGS. 1-3, FIG. 4 schematically illustrates the powder classification system of FIG. 2 with an alternative classification chamber. In the alternative powder classification system 300 of FIG. 4, the fluidized bed 110 includes a perforated plate 112 as in the example of FIG. 1. Unlike the example of FIG. 1, however, the perforated plate 112 is positioned at an angle, relative to a base of the fluidized bed 110. The angled perforated plate 112 allows larger powders that are not entrained in the gas flow to collect at a powder outlet 310. The powder outlet 310 provides the powder to a sealable powder container 324.

Figure 4:
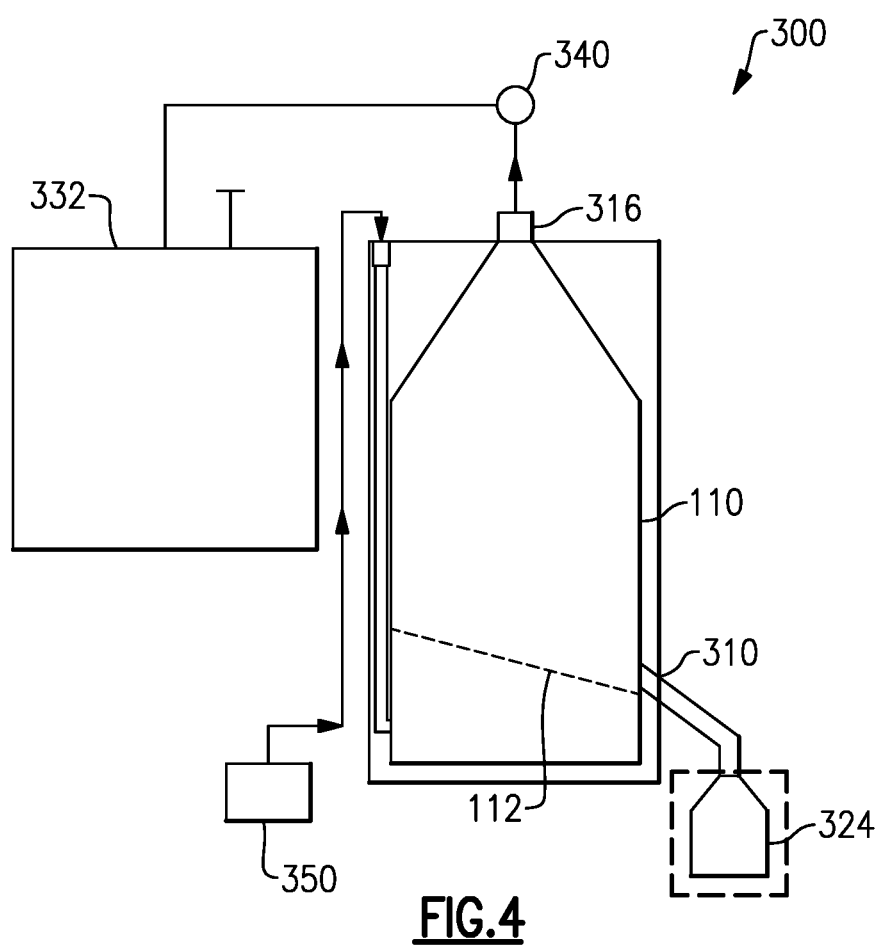
FIG. 4 schematically illustrates the fluidized classification system of FIG. 2 with an alternative powder removal configuration.

As with the example of FIG. 2, the example classification system 300 of FIG. 4 includes an outlet 316 connected to a fine particle collector 330 via a valve 340. During operation, the powder is degassed in the fluidized bed within the fluidized bed 110. Gas flow from the gas source 350 is directed through the outlet 316 to the fine powder classifier 330. Once the fine powder has been classified, the powder outlet 310 is opened and powder is gravity fed into the sealable powder container 324. In alternative examples, a forced feeding element can be utilized to drive the powder into the sealable powder container 334 instead of, or in addition to, gravity feeding.

In some systems, a vibrator, or other form of agitator can be connected to the classification chamber. The vibrator agitates the classification chamber, and the agitation enhances the fluidization of the powder.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fluidized powder heat treatment classification assembly comprising:
   a gas source;
   a fluidized bed connected to the gas source via a metered connection;
   the fluidized bed including a first output connected to a powder classifier via at least a first valve;
   the powder classifier including a catch container operable to decelerate a gas flow from the output and operable to catch particles entrained in the gas flow; and
   an output line connecting the fluidized bed to the first valve and a vibrator coupled to the output line, the vibrator being configured to vibrate the output line.

2. The assembly of claim 1, further comprising at least a first container configured to retain particles caught in said catch container.

3. The assembly of claim 1, wherein the first valve is one of a multi-output valve and a network of two-way valves, and wherein the assembly further comprises a fine powder collector.

4. The assembly of claim 3, wherein the fine powder collector includes a first fine powder collection chamber, and a liquid bubbler chamber connected to an output of the fine powder collection chamber.

5. The assembly of claim 4, wherein the fine powder collection chamber is shaped such that a flow of gas into the collection chamber is decelerated.

6. The assembly of claim 1, wherein the fluidized bed is a heated degassing chamber.

7. The assembly of claim 1, wherein the fluidized bed tapers into said first output and said taper is configured to accelerate a gas flow out of the first output.

8. The assembly of claim 1, wherein the fluidized bed includes a primary chamber including a perforated floor, a gas inlet below said perforated floor, such that gas entering the fluidized bed flows upward through said perforated floor to said first output.

9. The assembly of claim 8, wherein a speed of said gas is controlled via a gas inlet valve, and the gas inlet valve is controlled by a controller.

10. A fluidized powder heat treatment classification assembly comprising:
    a gas source;
    a fluidized bed connected to the gas source via a metered connection;
    the fluidized bed including a first output connected to a powder classifier via at least a first valve;
    the powder classifier including a catch container operable to decelerate a gas flow from the output and operable to catch particles entrained in the gas flow; and
    a cooling loop disposed between said first output and said powder classifier, the cooling loop being configured to cool a fluid passing from the first output to the powder classifier.

* * * * *